Aug. 25, 1953  F. G. ADAMS  2,650,287
ELECTRIC WATER HEATER
Filed Dec. 5, 1951
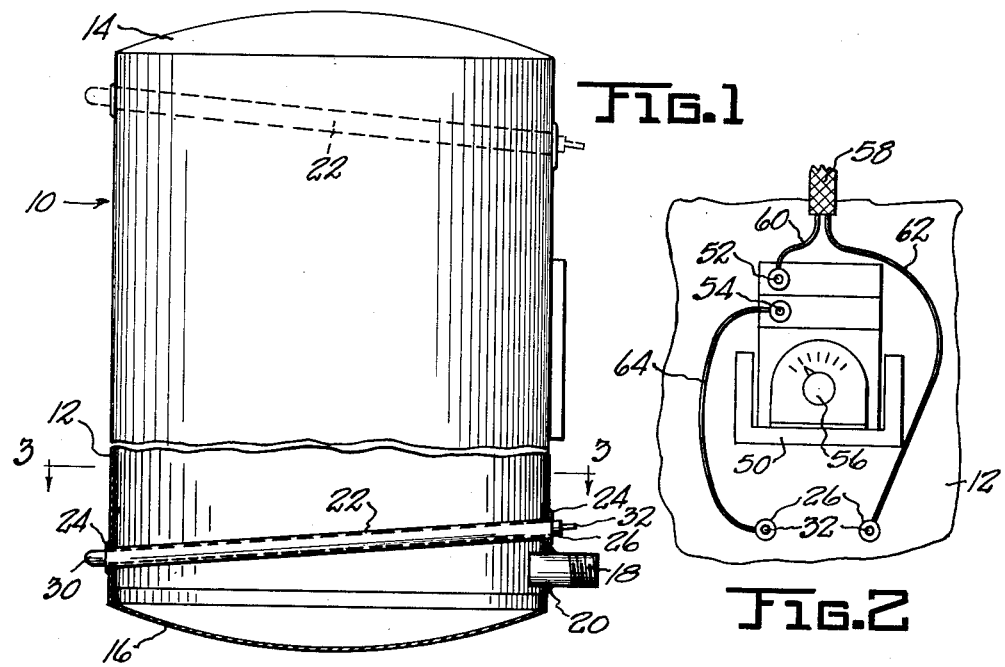
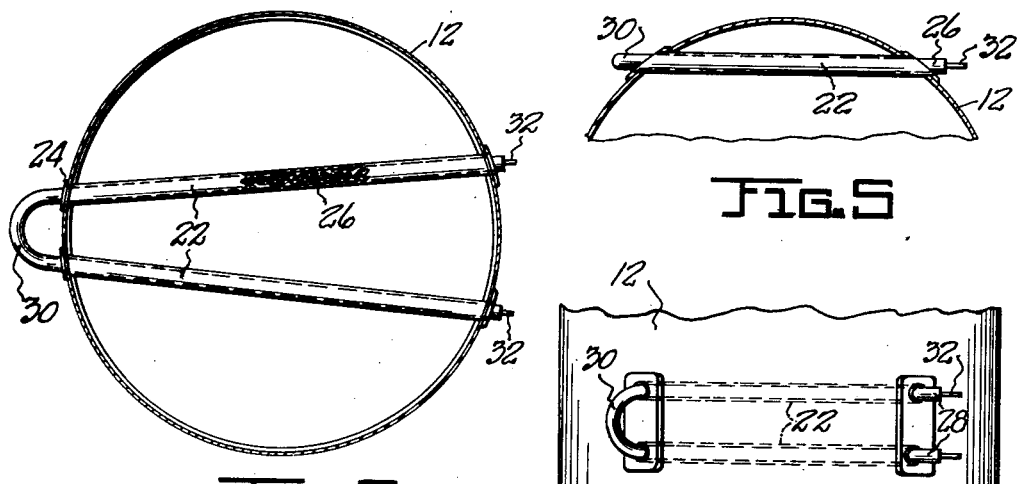
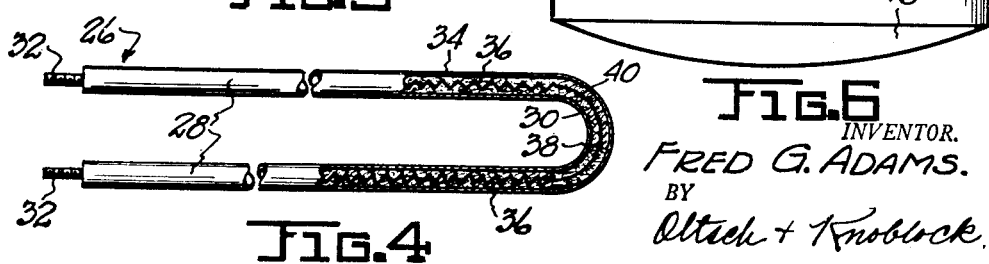
INVENTOR.
FRED G. ADAMS.
BY
Oltsch + Knoblock
ATTORNEYS.

Patented Aug. 25, 1953

2,650,287

UNITED STATES PATENT OFFICE 2,650,287

ELECTRIC WATER HEATER

Fred G. Adams, Quincy, Mich., assignor to General Manufacturing and Distributing Company, Quincy, Mich., a copartnership Application December 5, 1951, Serial No. 260,024

6 Claims. (Cl. 219—38)

This invention relates to improvements in electric water heaters.

Up to this time electric water heaters have all fallen into two categories, namely, the immersion type of water heater, and an indirect or external type of water heater. The immersion type of water heater has been characterized by location of the electrical heating element within the water chamber to be immersed in the water contained therein. This type of water heater is characterized by a high heat transfer efficiency. It has, however, certain disadvantages, including the danger of deterioration of the heating element by lime bearing water, and the danger of the occurrence of a short circuit in the electrical system. The indirect or external type of heater avoids the danger of deterioration by the lime bearing water and is less subject to development of short circuit, but its efficiency and its rate of heat exchange is low and its cost of operation is high when compared to an immersion type of water heater.

It is the primary object of this invention to provide a water heater so constructed that it possesses the high efficiency and low operating expense which characterize an immersion type of heater and which is so constructed as to protect the heating element against deterioration by lime bearing water, and in which the possibility of the occurrence of short circuit is small.

A further object of the invention is to provide a water heater which is simple in construction, which is characterized by ease of assembly of its constituent parts, which utilizes an inexpensive heating element and an inexpensive mounting in which the heating element is readily and quickly replaceable, and which possesses long life.

A further object is to provide a device of this character wherein a heating element acts directly upon the water to be heated but is mechanically isolated therefrom by means which serve as a heat transfer agent to provide a sufficient heat transfer to energize a control thermostat in the event the water chamber is empty but the heater element is energized, whereby the device is protected, and destruction of the heating element by overheating or burning is prevented.

A further object is to provide a device of this character so constructed as to avoid the electrostatic action which is common with heaters having immersion heating elements so as to avoid the danger of electrical shock to an individual touching the heater; and, further, to provide a heater in which no electrolytic action can occur.

A further object is to provide a device of this character wherein a water chamber is spanned by tubular members having a watertight solid joint with the container and open at their ends so as to receive therein with a wedging mechanical anchoring action an insulated electrical heating element of U-shape having elongated runs or leg portions which extend through said tubes and project from the opposite ends thereof.

A further object is to provide a water heater having a heating element which includes a part extending interiorly of a water container, and a part which is positioned exteriorly of the water container and in which the portion exterior of the water container has a reduced heat generating capacity compared to the portions of the heating element located within the water container.

Other objects will be apparent from the following specification.

In the drawing:

Fig. 1 is a side view of a water heater constituting one embodiment of my invention with parts shown in section.

Fig. 2 is a fragmentary detail view illustrating a thermostatic control for the water heater.

Fig. 3 is a transverse sectional view of the water heater.

Fig. 4 is a view of the electric heating element with parts shown in longitudinal section.

Fig. 5 is a fragmentary horizontal sectional view of a water heater constituting a modified embodiment of my invention.

Fig. 6 is a fragmentary side view of the embodiment of the invention illustrated in Fig. 5.

Referring to the drawing which illustrates the preferred embodiment of the invention, the numeral 10 designates a tank or container which may be of any desired size and shape and which has side walls 12, a top 14 and a bottom 16. The container will be provided with two or more conduits 18 extending through a wall thereof into communication with the interior of the container and being soldered or welded at 20 at its joint or junction with the tank to provide a watertight seal. One of the conduits 18 will constitute an inlet, and another conduit 18 will constitute an outlet. These conduits may be located in any manner found suitable. For example, the outlet conduit (not shown) may be located adjacent the upper part of the tank, while the inlet conduit is located at the lower part of the tank, thus affording the advantage of the convection action of heating water.

The tank is spanned by one or more pairs of conduits 22. These conduits are of a length to extend through openings in the container walls 12 at which they are longitudinally sealed, as by welded or soldered joints 24, or by any other sealing means found suitable. The conduits 22 will preferably be formed of metal and will be open at their opposite ends. The conduits may extend through the tank in any manner and at any location found suitable or desirable. Thus they may be positioned somewhat inclined to horizontal, as illustrated in Fig. 1, and they may be arranged in angular relation to each other, as illustrated in Fig. 3. If desired, two or more pairs of conduits 22 may be provided spaced from each other at any selected location in the container, as illustrated in Fig. 1.

An elongated electrical heating unit 26, preferably of substantially U-shape, as illustrated in Fig. 3, is provided, having two elongated leg portions 28 and a curved central or bight portion 30. The bight portion 30 will be bent substantially 180 degrees to space the portions of the legs 28 merging with the bight 30 a distance substantially equal to the spacing between adjacent tubes 22 of each pair. The leg portions 28 will be of a length at least equal to the tubes 22 which preferably have an internal diameter or bore size large enough to snugly but slidably receive the legs 28. The arrangement will be such that the bight portion 30 will be positioned exteriorly of the container 10, projecting from the adjacent ends of the pair of tubes 22, while the terminals 32 will project from the opposite ends of the tubes 22 and will be located externally of the water container 10.

The heating unit 26 will preferably be formed of normally rigid shape-retaining construction which may be bent or reshaped readily. It is contemplated that each heating element shall have such a shape that it has a mechanical wedging action within the tubes 22. This may be accomplished by extending the runs 28 of the element at such an angle to each other that said legs do not fit freely within the mounting tubes 22 but rather extend at a slight angle to said tubes, thus inducing a friction fit or a spring-retaining action adequate to hold the heating element in place and to avoid free play of the heating element within the tubes 22.

The heating element 26 may be of any construction found suitable. A preferred construction is illustrated and consists of an elongated metal tube 34 through which one or more electrical resistance wires extend with their opposite ends connected to the terminals 32. The resistance wires preferably include coil portions 36 which extend through the leg portions 28 for substantially full length thereof and a plain portion 38 extending through the bight portion 30 of the tubes. The electrical resistance wire 30 of the tubes. The electrical resistance wire is positioned centrally within the tube 36, uniformly spaced therefrom and out of contact therewith, and is held in that centered position by suitable insulating material 40, such as a ceramic material. Heating elements of this character are well known in the art and are characterized by a normal rigidity and shape retention but are susceptible to reshaping by bending, especially in cases where the tube is formed of copper or other ductile metal.

The use of a U-shaped heating element of the character described is preferred because of the ease of assembly thereof and because of the simplicity of construction and the elimination of securing means. Likewise two runs can be handled as one single unit, thus reducing the number of parts and making possible the use of the natural resilience or springiness or shape-retaining properties of the device to mechanically connect the parts against play when assembled. It will be understood, however, that the invention is not limited to the use of U-shaped heating elements and that each of the tubes 22 may mount an individual or separate heating element, and that fittings or clamps (not shown) of any character found suitable may be employed to hold such individual heating elements in proper or desired position within the tubes 22.

The construction of the device illustrated in Figs. 1 and 3 contemplates the location of the tubes 22 substantially at the same level and their positioning substantially centrally of the heating element. The position of the tubes at the same level and the central location of the tubes with respect to the water tank are both unnecessary. One construction in which neither of those characteristics exists is shown in Figs. 5 and 6. In this construction the two tubes 22 are located at levels, one above the other, within the tank and are located off-center with respect to the tank. This enables the use of a shorter or smaller heating element in a circular tank than would be required if the heating element were to extend through the center of the tank. In such instances a multiple of comparatively small heating elements may be used effectively in a large tank so as to avoid the necessity of one or more large heating elements.

The device will preferably be provided with a thermostatic control, and such control is illustrated in Fig. 2 as being mounted upon a vertical wall 12 of the container as by means of a bracket 50. This control is preferably in the nature of an adjustable thermostatic switch having terminals 52 and 54 and an adjustable setting member 56. An electrical supply line 58 has one conductor 60 connected to one of the terminals, here shown as the terminal 52, and has a second conductor 62 which is connected to one of the terminals 32 of the heating element 26. The other terminal 32 of the heating element 26 is connected by a conductor or lead 64 to the switch terminal 54. This arrangement is applicable to the U-shaped heating element illustrated in Fig. 3. It will be apparent, however, that in the event individual or separate heating elements are mounted in the different tubes, a further electrical connection to connect those separate elements must be made.

It will be apparent that this construction provides a high efficiency of heat transfer. The heating elements pass through the tubes 22, and these tubes in turn are directly immersed in the water. The tubes will preferably be made of metal and thus will possess high heating conducting properties. All of the heat generated by the portions of the heating elements located within the tubes will be delivered to the water to heat the same so that heat losses as are experienced with heaters having external heating elements are avoided. It will be observed that in this construction a further advantage exists in localizing the heat generating capacity of the heating unit to position it at the parts of the heating element which are mounted within the tubes 22. In other words, the coiling of the heating element at the runs 36 thereof concentrates the heat generating properties and multiplies the heat generating capacity compared to the heat generating capacity in the portion 30 of the heating unit in which the plain heating elements or resistance wire 38 is located. Thus heat losses due to the location of a part of the heating element exteriorly of the heater are held at a minimum and constitute only a very small proportion of the total heat generated.

The tubes 22 protect the heating element and its protective and insulating sheath from direct contact with the water. This prevents the deterioration which is commonly experienced with heaters having heating elements immersed within water, especially in localities where the water has a high percentage of lime or calcium content. Avoidance of deterioration of the protective and insulating sheath likewise avoids danger of short circuiting.

Another advantage of the construction is that the heat transfer from the heating element to the tubes occurs at all times. The tubes 22, being welded or otherwise secured to the wall 12 of the container, are in heat transfer relation thereto. The thermostat in turn is in intimate heat-transferring contact or relationship to the walls of the container. Consequently, if a condition arises in which the heating elements are energized while the heating tank is empty, the heat is carried off to the tank and to the thermostat and serves, upon heating of the tank, to energize the thermostat to shut off the heating element. This protects the heating element against overload which would ordinarily cause failure of the resistance wire by burning thereof under conditions in which no adequate heat transfer is provided so that the heat generated causes destruction of the insulation and of the resistance wire. This is an important consideration in some uses, such as in water heaters for house trailers. Water heaters of a trailer must be disconnected from a water supply source and from an electrical supply source while it is in motion. When the trailer is parked and being readied for use as a living quarter, the first connection which is customarily made in an electrical connection, especially if the trailer reaches its destination after dark. In such conditions the effecting of a connection with a water supply system may be somewhat delayed. If such delay occurs there is danger that the heating element of the water heater will overheat and destroy itself, as above mentioned, with conventional water heater constructions of the immersion type. That danger is eliminated with the present construction in the manner explained above.

The device is particularly well suited for use in vehicles for another reason, namely, the resilient mounting of the heating element within the tubes 22. In other words, the springiness or resilience of the heating element of U-shape as shown, which causes it to have a wedged fit, insures that vibration incident to movement of the vehicle will not release connectors or securing members which must customarily be employed to mount the heating element in proper position.

While the embodiments of the invention here illustrated and described are preferred, it will be understood that the constructions may be altered within the scope of the appended claims without departing from the spirit of the invention.

I claim:

1. An electric water heater comprising a container having a pair of spaced openings therein, an open-ended tube extending through said container and positioned to be immersed by water in said container, said tube having a sealed fit in said container openings, and an elongated externally insulated electric heating element removably mounted in said tube and projecting therefrom at its ends, said tube being formed of material having a high heat conductivity and having terminals located outwardly of said container and tube.

2. An electric water heater comprising a container having a pair of spaced openings therein, an open-ended tube extending through said container and positioned to be immersed by water in said container, said tube having a sealed fit in said container openings, and an electric heating element removably mounted in said tube, said tube and container both being formed of heat conducting material and having a heat conducting connection, and a thermostatic control for said heating element mounted externally of and sensitive to the temperature of said container.

3. An electric water heater comprising a water tank, a pair of open-ended metal tubes spanning said tank, said tank having openings receiving the end portions of said tubes with a sealed joint, and a U-shaped heating element having a pair of leg portions mounted in said tubes and an intermediate portion extending between and external of said tubes and tank.

4. An electric water heater comprising a water tank, a pair of open-ended metal tubes spanning said tank, said tank having openings receiving the end portions of said tubes with a sealed joint, and a U-shaped heating element having a pair of leg portions mounted in said tubes, the leg portions of said heating element having a higher heat generating capacity than the intermediate portion of said element extending between said tubes and externally of said tank.

5. An electric water heater comprising a water tank, a pair of open-ended metal tubes spanning said tank, said tank having openings receiving the end portions of said tubes with a sealed joint, and a U-shaped heating element having a pair of leg portions mounted in said tubes, said tubes being positioned in angular relation to each other and said heating element being resilient whereby said heating element has a wedged fit in said tubes.

6. An electric water heater comprising a water tank, a pair of open-ended metal tubes spanning said tank, said tank having openings receiving the end portions of said tubes with a sealed joint, and a U-shaped heating element having a pair of leg portions mounted in said tubes and an intermediate portion extending between said tubes, said heating element comprising an electric resistance wire, a metal sheath, and insulation material filling said sheath and positioning said resistance wire spaced from said sheath in electrically insulated relation thereto.

FRED G. ADAMS.

References Cited in the file of this patent
UNITED STATES PATENTS

| Number | Name | Date |
|---|---|---|
| 1,324,002 | Barnstead | Dec. 2, 1919 |
| 1,359,400 | Lightfoot | Nov. 16, 1920 |
| 1,564,681 | Kercher | Dec. 8, 1925 |
| 1,829,785 | Christian | Nov. 3, 1931 |
| 1,916,861 | Hynes et al. | July 4, 1933 |
| 2,014,146 | Samuels | Sept. 10, 1935 |